(12) United States Patent
Yuan (10) Patent No.: US 11,509,820 B2
(45) Date of Patent: Nov. 22, 2022

(54) METHOD, ELECTRONIC DEVICE AND STORAGE MEDIUM FOR SHOOTING VIDEO

(71) Applicant: BEIJING DAJIA INTERNET INFORMATION TECHNOLOGY CO., LTD., Beijing (CN)

(72) Inventor: Yinghu Yuan, Beijing (CN)

(73) Assignee: Beijing Dajia Internet Information Technology Co., LTD., Beijing (CN)

( * ) Notice: Subject to any disclaimer, the term of this patent is extended or adjusted under 35 U.S.C. 154(b) by 0 days.

(21) Appl. No.: 17/489,197

(22) Filed: Sep. 29, 2021

(65) Prior Publication Data
US 2022/0294979 A1 Sep. 15, 2022

(30) Foreign Application Priority Data
Mar. 9, 2021 (CN) .......................... 202110257848.2

(51) Int. Cl.
*H04N 5/232* (2006.01)
*H04N 5/262* (2006.01)
*H04N 5/06* (2006.01)

(52) U.S. Cl.
CPC ............ *H04N 5/23222* (2013.01); *H04N 5/06* (2013.01); *H04N 5/2621* (2013.01)

(58) Field of Classification Search
CPC ..... H04N 5/23222; H04N 5/06; H04N 5/2621
See application file for complete search history.

(56) References Cited

U.S. PATENT DOCUMENTS

| 7,569,761 | B1* | 8/2009 | Iampietro | ............... G11B 27/28 84/600 |
|---|---|---|---|---|
| 2015/0160916 | A1 | 6/2015 | Lothian | |
| 2017/0110151 | A1 | 4/2017 | Matias et al. | |
| 2020/0211517 | A1 | 7/2020 | Tsutaki | |
| 2020/0335133 | A1 | 10/2020 | Vaucher | |
| 2021/0195284 | A1* | 6/2021 | Song | ................ H04N 21/47205 |

FOREIGN PATENT DOCUMENTS

| CN | 109819171 A | 5/2019 |
|---|---|---|
| CN | 110771150 A | 2/2020 |
| CN | 111328387 A | 6/2020 |
| CN | 111726536 A | 9/2020 |
| CN | 112188307 A | 1/2021 |

OTHER PUBLICATIONS

European Patent Office, Search Report for EP application 21199086.6, dated Mar. 22, 2022.
Chinese Office Action for CN application 202110257848.2 with English Translation.

* cited by examiner

*Primary Examiner* — Twyler L Haskins
*Assistant Examiner* — Fayez A Bhuiyan
(74) *Attorney, Agent, or Firm* — Timothy W. Menasco, Esq.; Harter Secrest & Emery LLP (57) ABSTRACT

The disclosure can provide a method for shooting a video. The method includes: obtaining a target music file for shooting the video and a preset shooting duration; obtaining shooting guidance information based on beat information of the target music file and the preset shooting duration; the shooting guidance information including a number of clips of the video within the preset shooting duration and a clip duration of each of the clips; and displaying the shooting guidance information in a shooting interface.

16 Claims, 8 Drawing Sheets

METHOD, ELECTRONIC DEVICE AND STORAGE MEDIUM FOR SHOOTING VIDEO

CROSS-REFERENCE TO RELATED APPLICATION

The disclosure claims priority to Chinese Patent Application No. 202110257848.2 filed on Mar. 9, 2021, the content of which is hereby incorporated by reference into this disclosure.

FIELD

The disclosure relates to the field of Internet techniques, and more particularly, to a method, an electronic device and a storage medium for shooting a video.

BACKGROUND

The development of network techniques has made video applications very popular in people's daily lives. Video interactive software provides diversified operation experience for users such as users may shoot videos of different styles anytime and anywhere, add various special effects for videos and set background music of different types for videos.

SUMMARY

According to a first aspect of embodiments of the disclosure, a method for shooting a video is provided. The method includes: obtaining a target music file for shooting the video and a preset shooting duration; obtaining shooting guidance information based on beat information of the target music file and the preset shooting duration; the shooting guidance information including a number of clips of the video within the preset shooting duration and a clip duration of each of the clips; and displaying the shooting guidance information in a shooting interface.

According to a second aspect of embodiments of the disclosure, an electronic device is provided. The electronic device includes a processor; and a memory for storing instructions executable by the processor. The processor is configured to execute the instructions to perform the method in the first aspect.

According to a third aspect of embodiments of the disclosure, a non-transitory computer-readable storage medium is provided. When instructions in the storage medium are executed by a processor of an electronic device, the electronic device is caused to perform the method in the first aspect.

The target music file for shooting the video and the preset shooting duration are obtained. The shooting guidance information is obtained based on the beat information of the target music file and the preset shooting duration. The shooting guidance information includes the number of clips of the video within the preset shooting duration and the clip duration of each of the clips. The shooting guidance information is displayed in the shooting interface. In the disclosure, the shooting guidance information is obtained based on the beat information of the target music file and the preset shooting duration. The shooting guidance information displayed on the interface may guide the user to directly shoot the video that fits beats of the target music, without video clip adaptation after shooting. The loss of original video content caused by video clip adaptation may be avoided and the efficiency of video shooting may be improved.

It is to be understood that both the foregoing general description and the following detailed description are exemplary and explanatory only and are not restrictive of the disclosure.

BRIEF DESCRIPTION OF THE DRAWINGS

The drawings, which are incorporated in and constitute a part of this specification, illustrate embodiments consistent with the disclosure and, together with the description, serve to explain the principles of the disclosure, but may not constitute an improper limitation of the disclosure.

DETAILED DESCRIPTION

To enable those skilled in the art to better understand the technical solutions of the disclosure, the technical solutions in embodiments of the disclosure will be described clearly and completely with reference to the drawings.

It should be noted that the terms such as "first" and "second" in the specification and claims and the drawings of the disclosure are used to distinguish similar objects, and not necessarily used to describe a specific order or sequence. It should be understood that the data used in this way may be interchanged with each other under appropriate circumstances so that the embodiments of the disclosure described herein may be implemented in a sequence other than those illustrated or described herein. The implementation manners described in the following embodiments do not represent all implementation manners consistent with the disclosure. Rather, they are merely examples of apparatuses and methods consistent with some aspects of the disclosure as detailed in the appended claims.

Figure 1:
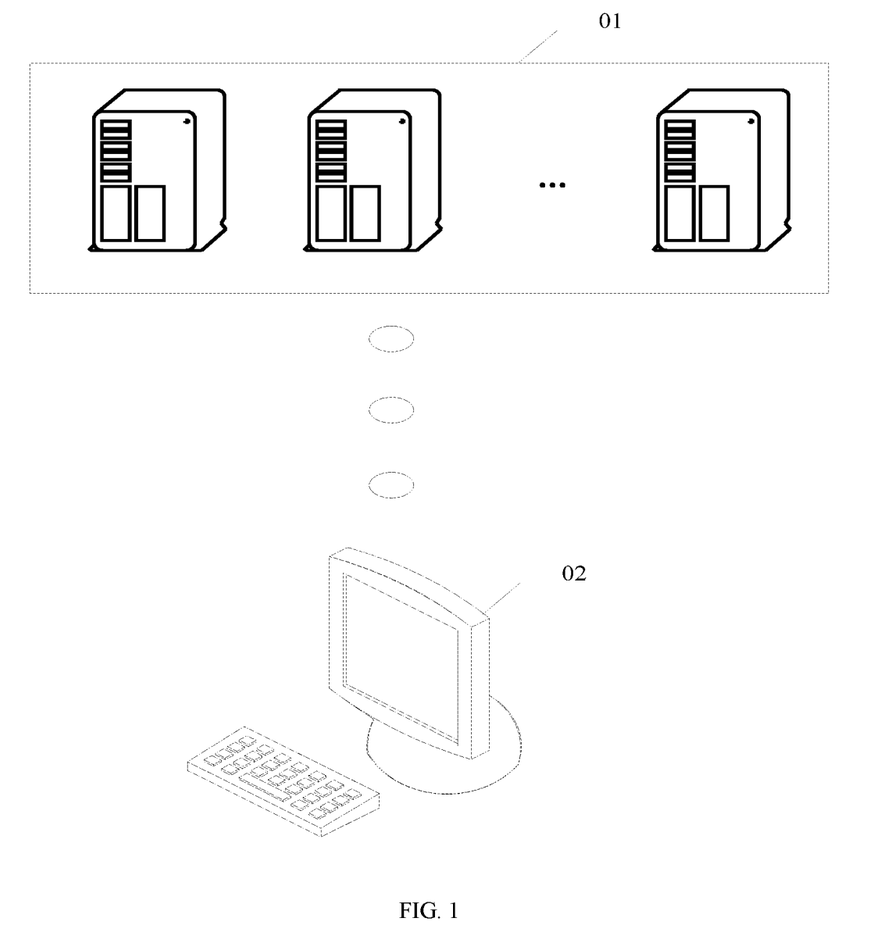
FIG. 1 is a schematic diagram illustrating an application environment according to some embodiments of the disclosure.

With reference to FIG. 1, FIG. 1 is a schematic diagram illustrating an application environment according to some embodiments of the disclosure. As illustrated in FIG. 1, the application environment may include a server 01 and a terminal device 02. In some embodiments, the server 01 and the terminal device 02 may be coupled to each other through a wireless link or a wired link, which is limited in the disclosure.

In some embodiments, the server 01 may provide different music to the terminal device 02 for a user to select. In detail, the server 01 may be an independent physical server, a server cluster or distributed system including a plurality of physical servers or a cloud server that may provide basic cloud computing services such as cloud services, cloud databases, cloud computing, cloud functions, cloud storage, network services, cloud communications, middleware services, domain name services, security services, CDN (Content Delivery Network), and big data and artificial intelligence platforms. In some embodiments, an operating system running on the server 01 may include, but be not limited to, IOS™, Linux™, Windows™, Unix™, Android™ and the like. In some embodiments, the terminal device 02 may receive various music provided by the server 01. After selecting a target music file from various music files, shooting guidance information may be obtained based on beat information of the target music file and a preset shooting duration; the shooting guidance information includes a number of clips of the video within the preset shooting duration and a clip duration of each of the clips and the shooting guidance information is displayed in a shooting interface. The terminal device 02 may include, but be not limited to an electronic device such as a smart phone, a desktop computer, a tablet computer, a laptop, a smart speaker, a digital assistant, an augmented reality (AR)/virtual reality (VR) device, a smart wearable device. In some embodiments, an operating system running on the terminal device 02 may include, but be not limited to, Android™, IOS™, Linux™, Windows™ and the like.

In addition, it should be noted that what is illustrated in FIG. 1 is one application environment of the method for shooting the video, provided by the disclosure. In actual applications, other application environments may also be included.

Figure 2:
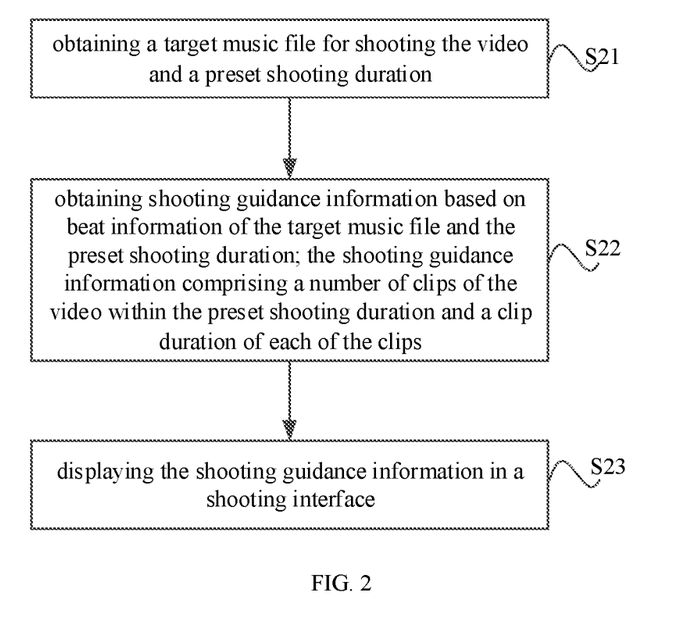
FIG. 2 is a flowchart of a method for shooting a video according to some embodiments of the disclosure.

FIG. 2 is a flowchart of a method for shooting a video according to some embodiments of the disclosure. As illustrated in FIG. 2, the method for shooting the video may be suitable for electronic devices such as servers and terminals. The method includes the following.

In S21, a target music file for shooting the video and a preset shooting duration are obtained.

In some embodiments, when the terminal device launches an application based on an application launch instruction of the user and switches to a shooting interface, it may display music files on a display interface. Each of the music files may be referred to by a name of music. Or, each of the music files may be referred to by a name of music and a cover of music.

In some embodiments, the terminal device may obtain the target music file in response to a music selection instruction. In detail, when the terminal device detects that there is a touch on an interface region corresponding to the target music file, the target music file may be obtained. Or, when an audio input module of the terminal device receives an identifier of the target music file, the target music file may be obtained. The identifier may be the music name of the target music file. In some embodiments, in a case that the target music file has been selected before, the target music file is stored in a local storage of the terminal device. Therefore, the terminal device may extract the target music file from the local storage. When the target music file has not been selected by the user, the terminal device may establish a link with the server, download the target music file from the server and store the target music file in the local storage.

In some embodiments, the target music file may be a complete song file or a repetitive combination file of a certain clip of a song.

In some embodiments, the display interface of the terminal device may display selectable preset shooting durations. The selectable preset shooting durations may be different, such as 56 seconds, 57 seconds or 3 minutes. The terminal device may obtain the preset shooting duration for shooting the video after detecting that a region of the selectable preset shooting duration is touched.

In other embodiments, the display interface of the terminal device may not display specific preset shooting durations but display a range of shooting durations. The user may select a preset shooting duration that he/she wants within the range of shooting durations and enter the preset shooting duration that he/she wants in a shooting duration input box, so that the terminal device may obtain the preset shooting duration.

In S22, shooting guidance information is obtained based on beat information of the target music file and the preset shooting duration. The shooting guidance information includes a number of clips of the video within the preset shooting duration and a clip duration of each of the clips.

Figure 3:
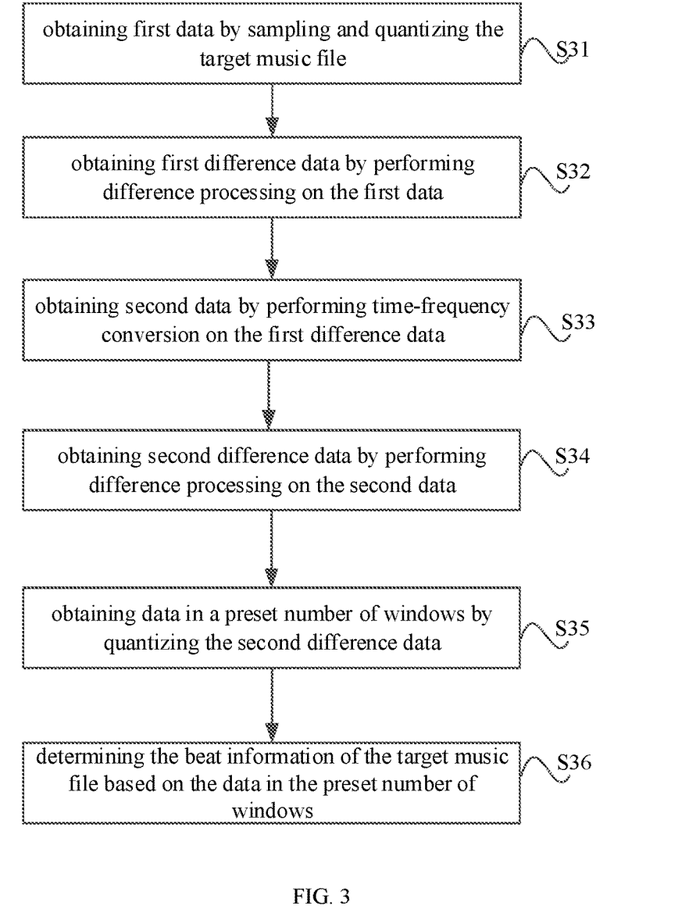
FIG. 3 is a flowchart of determining beat information according to some embodiments of the disclosure.

Before S22, the disclosure also provides some embodiments for determining beat information. FIG. 3 is a flowchart of determining beat information according to some embodiments of the disclosure. As illustrated in FIG. 3, determining beat information includes the following.

In S31, first data are obtained by sampling and quantizing the target music file.

In some embodiments, the terminal device may sample the target music file. For example, 1024 sampling points are obtained after each sampling and 1024 sampling points may be understood as data points within one window. The terminal device may quantize 1024 sampling points subsequently.

The sampling and quantizing may include first obtaining a new input stream, performing waveform decoding processing on the new input stream, performing floating-point sampling on the processed input stream to obtain 1024 sampling points and performing quantizing on the sampling points. In this way, the first data processed may be obtained.

In S32, first difference data are obtained by performing difference processing on the first data.

In detail, the terminal device may subtract previous window data from current window data to obtain difference data. The difference formula may be as a formula (1):

$$SF(k) = \sum_{i=0}^{n-1} s(k, i) - s(k-1, i). \qquad (1)$$

In S33, second data are obtained by performing time-frequency conversion on the first difference data.

To facilitate subsequent processing, the terminal device may perform time-frequency conversion on the above-mentioned difference data to obtain the second data. The time-frequency conversion is realized based on Fourier transformation.

In S34, second difference data are obtained by performing difference processing on the second data.

The audio rhythm may basically be seen from the data processed through Fourier transformation and difference processing.

In S35, data in a preset number of windows are obtained by quantizing the second difference data.

In some embodiments, the quantizing may use a moving average method. The general sampling rate of audio is 44100 or 48000. 44100 may be taken as an example herein.

According to the above content, the disclosure sets the size of the window to 1024. Therefore, the number of whole windows in 1 second is 43 and a duration represented by one window is 1000/(44100/1024)=23.22 milliseconds. When the average value is calculated in an interval of 0.5 seconds, the required windows may be about 22. In some embodiments, the first 10 windows and the last 10 windows may be taken to calculate the average value. In this way, the results of 10 windows may be obtained.

In S36, the beat information of the target music file is determined based on the data in the preset number of windows.

In some embodiments, the above-mentioned determination of the beat information of the target music file based on the data in the preset number of windows may be determined by peak detection.

In this way, the beat information of the target music file is determined through S31-S36.

The above-mentioned scheme for determining the beat information of the target music file may be implemented by the terminal device. In some embodiments, the program for the scheme of determining the beat information may exist in the terminal device. The terminal device may download this program synchronously when downloading the application. When the beat information needs to be determined, the program is directly called for processing.

In other embodiments, the above-mentioned scheme for determining the beat information of the target music file may be implemented by the server. The program for the scheme of determining the beat information may exist in the server. After the terminal device selects the target music file, the terminal device may send a beat information determination instruction to the server when the target music file is stored locally. The beat information determination instruction carries an identifier of the target music file. The beat information determination instruction is configured to instruct the server to determine the beat information of the target music file. After the server determines the beat information of the target music file, it may feed the beat information of the target music file back to the terminal device. When the target music file is not stored locally, the server may determine the beat information of the target music file before sending the target music file to the terminal device and uniformly send the target music file and the corresponding beat information to the terminal device.

In other embodiments, some target music files may have description information. The description information may include a type of target music, beat information, a creator and other information. After the terminal device obtains the target music file, it may obtain the beat information from the description information.

Through the above two manners, the terminal device may obtain the beat information of the target music file to prepare for the subsequent determination of the shooting guidance information.

In some embodiments of the disclosure, the terminal device may determine at least one beat duration in the target music file based on the data in the preset number of windows. The beat duration may refer to a period of time occupied by each beat in the target music file. Every music has its own speed. Generally speaking, the speed of most music is constant. Therefore, most music has one beat duration. In music, time is divided into equal basic units and each unit is called one "beat". The duration of the beat is represented by a duration of notes. The duration of one beat may be a quarter note (that is, a quarter note is one beat), a half note (that is, a half note is one beat) or an eighth note (that is, an eighth note is one beat). The duration of the beat is a relative concept of time. For example, when the specified speed of a music is 60 beats per minute, the duration occupied by each beat is one second and the duration of one-half of one beat is one-half of one second; when the specified speed of a music is 120 beats per minute, the duration occupied by each beat is one-half of one second and the duration of one-half of one beat is a quarter of a second, and so on. After the duration of the beat is determined, notes of various durations are associated with beats. Of course, there are also some music that has a variable speed. Therefore, there are beat durations of this type of music. The determined number of beat durations pave the way for subsequent determination of shooting guidance information based on different numbers of beat durations.

In some embodiments, the terminal device may preset a preset clip duration and a preset number of clips for shooting the video. Since an excessive number of clips will increase the complexity of the user's shooting, it may be set within a preset range. For example, the preset number of clips is less than or equal to 8 clips. Since a too short clip duration will affect the content that the user wants to express in the normal shooting, it may be set within a preset range. For example, the preset clip duration is greater than or equal to 3 seconds.

In some embodiments, the preset clip duration and preset number of clips may be manually set. In some embodiments, the preset clip duration and preset number of clips may be determined by the device based on historical videos. In some embodiments, the terminal device may obtain a set of historical videos and determine a target historical video that satisfies requirements from the set of historical videos based on video attribute information. The video attribute information includes at least one of: a number of forwards, a number of views, a number of likes, a number of rewards, a number of fans and a number of comments. The preset clip duration range of each clip and the preset number range of clips, may be obtained by analyzing the target historical video.

In some embodiments, after obtaining the set of historical videos, the terminal device may determine the number of forwards, the number of views, the number of likes, the number of rewards, the number of fans and the number of comments, of each historical video in the set of historical videos. The terminal device may determine a historical video of which the number of forwards satisfies a first number, the number of views satisfies a second number, the number of likes satisfies a third number, the number of rewards satisfies a fourth number, the number of fans satisfies a fifth number, and the number of comments satisfies a sixth number, as the target historical video. The first number, the second number, the third number, the fourth number, the fifth number and the sixth number may be preset. The number of clips of sub-segments in each historical video and the clip duration of each sub-segment may be obtained by analyzing the determined target historical video. The preset number of clips is determined based on the number of clips of sub-segments in each historical video. The preset clip duration is determined based on the clip duration of each sub-segment.

In this way, the popular target historical video that satisfies requirements may be determined under the investigation based on big data. The scientific preset number of clips and preset clip duration may be determined based on the target historical video. It may provide scientific and effective data support for the preset number of clips and preset clip duration.

In some embodiments, if the beat information includes a plurality of beat durations, the terminal device may determine the number of clips of the video and the clip duration of each of the clips based on the plurality of beat durations, the preset shooting duration, the preset clip duration and the preset number of clips. The terminal device may determine the shooting guidance information based on the number of clips of the video and the clip duration of each of the clips.

It may continue the explanation based on the above example. It is assumed that the preset number of clips is less than or equal to 8 clips and the preset clip duration is greater than or equal to 3 seconds. If durations of beats in the target music file is 4 seconds, 5 seconds, 3 seconds, 3 seconds, 5 seconds, 5 seconds, 5 seconds, 5 seconds, 5 seconds and 5 seconds, there are 3 types of durations and a total of 10 beat durations. The terminal device may determine that each beat duration is greater than or equal to 3 seconds, which may satisfy the preset clip duration, but there are 10 beat durations in total, which may not satisfy the preset number of clips. Therefore, it may be divided into 8 video clips: clip 1 (4 seconds), clip 2 (5+3=8 seconds), clip 3 (3+5=8 seconds), clip 4 (5 seconds), clip 5 (5 seconds), clip 6 (5 seconds), clip 7 (5 seconds) and clip 8 (5 seconds).

Figure 4:
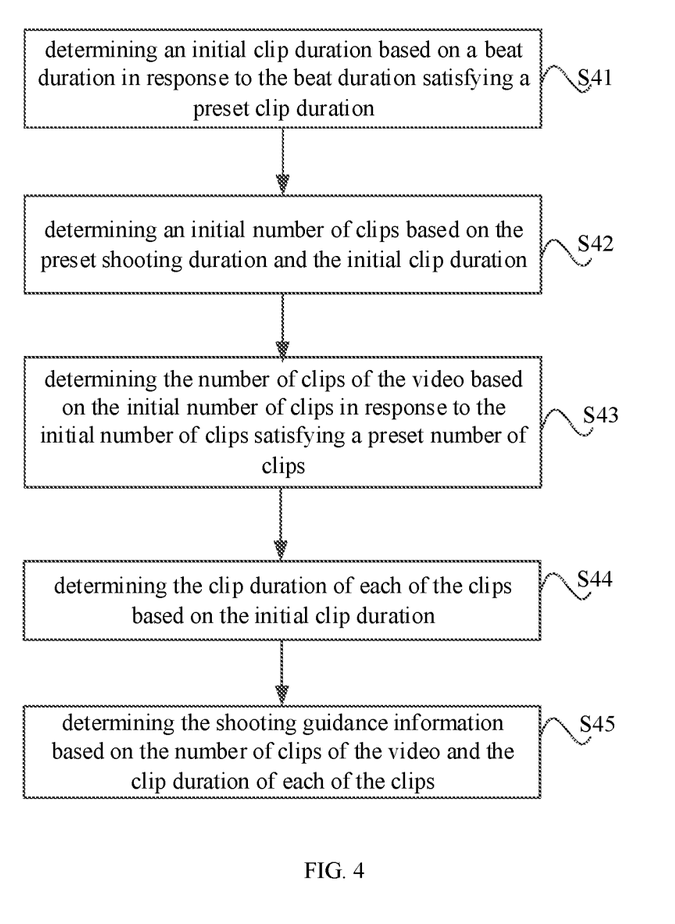
FIG. 4 is a flowchart of determining a number of clips and a clip duration according to some embodiments of the disclosure.

In other embodiments, the beat information may include one beat duration. FIG. 4 is a flowchart of determining a number of clips and a clip duration according to some embodiments of the disclosure. As illustrated in FIG. 4, it may include the following.

In S41, an initial clip duration is determined based on a beat duration in response to the beat information including the beat duration and the beat duration satisfying a preset clip duration.

It may continue the explanation based on the above example. The preset number of clips is less than or equal to 8 clips and the preset clip duration is greater than or equal to 3 seconds. If the beat duration is 4 seconds, 4 seconds is greater than or equal to 3 seconds and it may be determined that the beat duration of 4 seconds is the initial clip duration.

In S42, an initial number of clips is determined based on the preset shooting duration and the initial clip duration.

In some embodiments, the terminal device may determine the initial number of clips based on a quotient of the preset shooting duration and the initial clip duration. If the preset shooting duration is 28 seconds, it may be determined that the initial number of clips is 28/4=7 clips. If the preset shooting duration is 57 seconds, it may be determined that the initial number of clips is 57/4=14.25 clips.

In S43, the number of clips of the video is determined based on the initial number of clips in response to the initial number of clips satisfying a preset number of clips.

In S44, the clip duration of each of the clips is determined based on the initial clip duration.

It may continue the explanation based on the above example. If the initial number of clips is 7 clips, which is less than or equal to 8 clips, it may be determined that the initial number 7 of clips is the number of clips of the video and the initial clip duration of 4 seconds is determined as the clip duration of each of the clips.

If the initial number of clips is 14.25 clips, which does not satisfy the requirement of 8 clips or less, that is, the initial number is outside the preset number of clips, the terminal device may multiply the beat duration by a second preset multiple to obtain an adjusted clip duration. The adjusted clip duration is within the preset clip duration range. For example, the adjusted initial clip duration is 4*2=8 seconds and 8 seconds satisfy the condition that it is more than 3 seconds. The terminal device may determine an adjusted number of clips based on the preset shooting duration and the adjusted clip duration. In some embodiments, the terminal device may determine the adjusted number of clips based on a quotient of the preset shooting duration and the adjusted clip duration, such as 57/8=7.125 clips, which may be determined that the adjusted number of clips is within the preset number of clips. The number of clips of the video is determined based on the adjusted number of clips. In some embodiments, since 0.125*8=1 second, which does not satisfy the rule of 3 seconds or more, the terminal device may determine that the number of clips of the video is 7 clips. The clip duration of each of the clips may be determined based on the adjusted clip duration. In detail, the clip duration of the first 6 clips is determined to be 8 seconds and the clip duration of the seventh clip is 9 seconds.

In some embodiments, in an example, if the adjusted number of clips is 7.75 and it is determined that the adjusted number of clips is within the preset number of clips, the number of clips of the video is determined based on the adjusted number of clips. In some embodiments, since 0.75*8=6 seconds, which satisfies the rule of 3 seconds or more, the terminal device may determine that the number of clips of the video is 8 clips. At this time, the number of clips of the video satisfies the preset number of clips. The clip duration of each of the clips may be determined based on the adjusted clip duration. In detail, the clip duration of the first 7 clips is determined to be 8 seconds and the clip duration of the eighth clip is 6 seconds. Or, the clip duration of the first 6 clips is 8 seconds and the clip duration of the seventh clip is 14 seconds.

In S45, the shooting guidance information is determined based on the number of clips of the video and the clip duration of each of the clips.

Through the above implementation, the number of clips of the video in the shooting guidance information may satisfy the preset number of clips and the clip duration of each of the clips satisfy the preset clip duration. Therefore, the user may be guided to shoot the video under a scientific and effective instruction.

Figure 5:
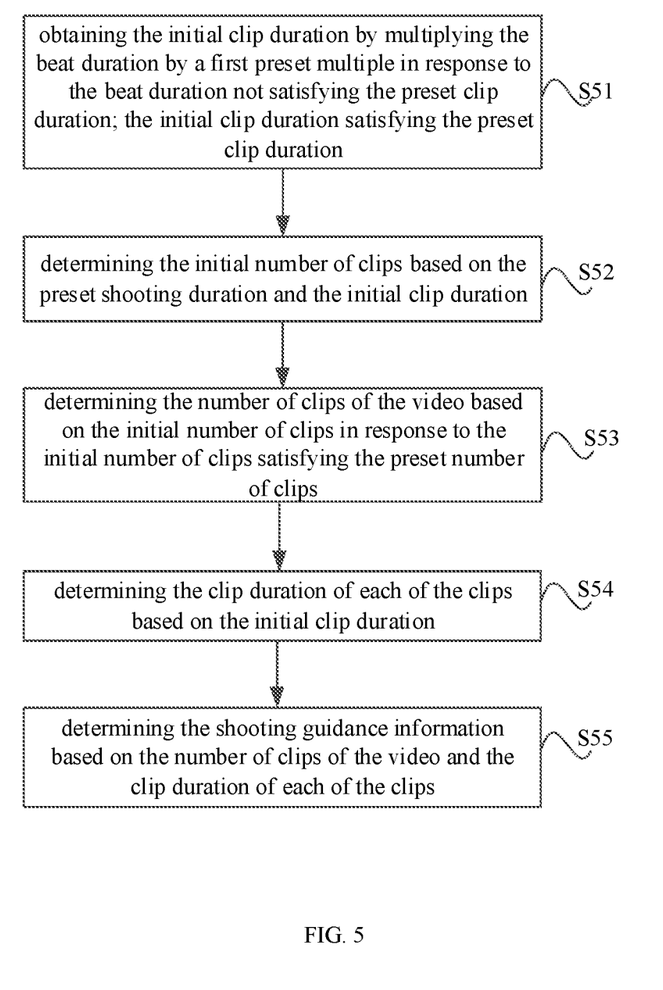
FIG. 5 is a flowchart of determining a number of clips and a clip duration according to some embodiments of the disclosure.

FIG. 5 is a flowchart of determining a number of clips and a clip duration according to some embodiments of the disclosure. As illustrated in FIG. 5, it may include the following.

In S51, the initial clip duration is obtained by multiplying the beat duration by a first preset multiple in response to the beat duration not satisfying the preset clip duration; the initial clip duration satisfying the preset clip duration.

It may continue the explanation based on the above example. The preset number of clips is less than or equal to 8 clips and the preset clip duration is greater than or equal to 3 seconds. If the beat duration is 2.5 seconds, 2.5 seconds does not satisfy 3 seconds or more. The beat duration is multiplied by the first preset multiple to obtain the initial clip duration. For example, 2.5*2=5 is determined as the initial clip duration. 5 seconds are within the preset clip duration.

In S52, the initial number of clips is determined based on the preset shooting duration and the initial clip duration.

In some embodiments, the terminal device may determine the initial number of clips based on a quotient of the preset shooting duration and the initial clip duration. If the shooting duration is 30 seconds, it may be determined that the initial number of clips is 30/5=6 clips.

In S53, the number of clips of the video is determined based on the initial number of clips in response to the initial number of clips satisfying the preset number of clips.

In S54, the clip duration of each of the clips is determined based on the initial clip duration. It may continue the explanation based on the above example. If the initial number of clips is 6 clips, it is less than or equal to 8 clips and the initial number 6 of clips may be determined as the number of clips of the video. The initial clip duration of 5 seconds is determined as the clip duration of each of the clips.

If the initial number of clips is 11.4 clips, it may not satisfy the requirement of less than or equal to 8 clips, that is, the initial number of clips is outside the preset number of clips. The terminal device may multiply the beat duration by other preset multiple to obtain the adjusted initial clip duration. The adjusted clip duration is within the preset clip duration range. For example, the adjusted initial clip duration is 2.5*3=7.5 seconds and 7.5 seconds satisfy the condition of more than or equal to 3 seconds.

The terminal device may determine the adjusted number of clips based on the preset shooting duration and the adjusted clip duration. In some embodiments, the terminal device may determine the adjusted number of clips based on a quotient of the preset shooting duration and the adjusted clip duration, such as 57/7.5=7.6 clips. It is determined that the adjusted number of clips is within the preset number of clips. The number of clips of the video is determined based on the adjusted number of clips. In some embodiments, since 0.6*7.5=4.5 seconds, which is compliance with the rule greater than or equal to 3 seconds, the terminal device may determine that the number of clips of the video is 8 clips. At this time, the number of 8 clips of the video satisfies the preset number of clips. The clip duration of each of the clips is determined based on the adjusted clip duration. In detail, the clip duration of the first 7 clips is determined to be 7.5 seconds and the clip duration of the eighth clip is 4.5 seconds. Or, the clip duration of the first 6 clips is 7.5 seconds and the clip duration of the seventh clip is 12 seconds.

In some embodiments, in a certain example, if the adjusted number of clips is 7.2, it is determined that the adjusted number of clips is within the preset number of clips. The number of clips of the video is determined based on the adjusted number of clips. In some embodiments, since 0.2*7.5=1.5 seconds, which is not compliance with the rule greater than or equal to 3 seconds, the terminal device may determine that the number of clips of the video is 7 clips. The clip duration of each of the clips is determined based on the adjusted clip duration. In detail, it is determined that the clip duration of the first 6 clips is 7.5 seconds and the clip duration of the seventh clip is 9 seconds.

In other embodiments, the terminal device may determine the number of clips based on the preset shooting duration and the initial clip duration. The clip duration of each clip may be a multiple of the beat duration. For example, if the shooting duration is 40 seconds, the clip duration of the first clip is 4 seconds, the clip duration of the second clip is 8 seconds, the clip duration of the third clip is 8 seconds, the clip duration of the fourth clip is 8 seconds, the clip duration of the fifth clip is 8 seconds and the clip duration of the sixth clip is 4 seconds. In this way, the initial number of clips is 6 clips.

In S55, the shooting guidance information is determined based on the number of clips of the video and the clip duration of each of the clips.

Through the above implementation, the number of clips of the video in the shooting guidance information may satisfy the preset number of clips and the clip duration of each of the clips satisfy the preset clip duration. Therefore, the user may be guided to shoot the video under a scientific and effective instruction.

Referring back to FIG. 2, in S23, the shooting guidance information is displayed in a shooting interface.

In some embodiments, the terminal device may display the shooting guidance information in the shooting interface. In some embodiments, the shooting guidance information may be a shooting guidance control. A number of time clips included in the shooting guidance control is corresponding to the number of clips of the video and durations of the time clips included in the shooting guidance control are corresponding to durations of the clips one by one.

Figure 6:
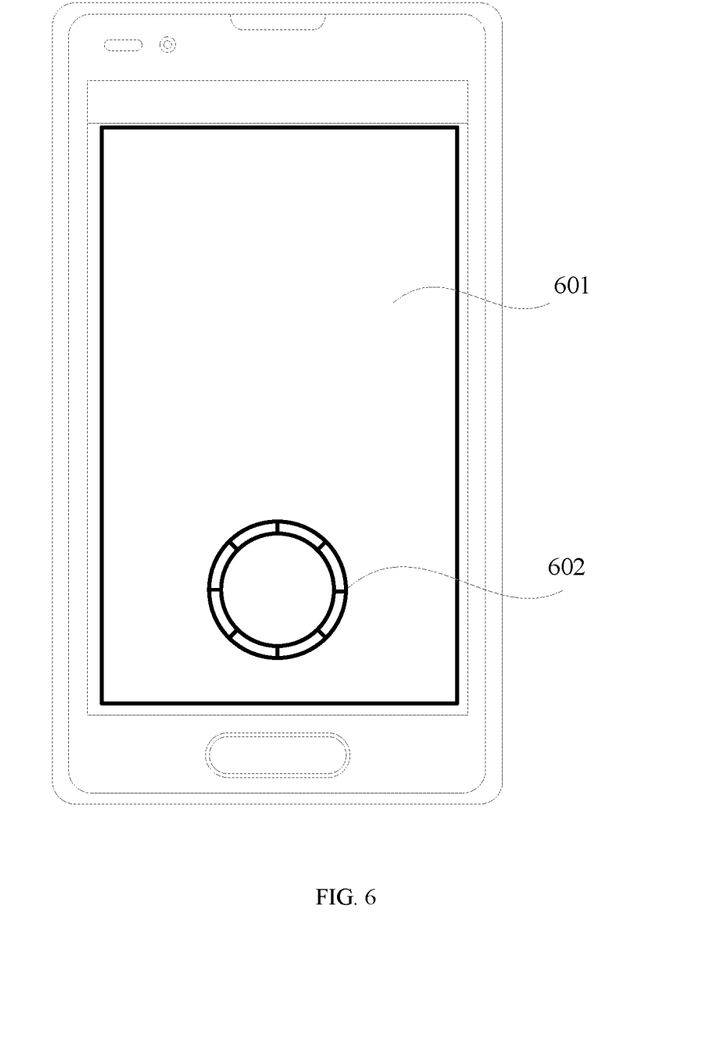
FIG. 6 is a schematic diagram illustrating a shooting guidance control in an interface according to some embodiments of the disclosure.

FIG. 6 is a schematic diagram illustrating a shooting guidance control in an interface according to some embodiments of the disclosure. As illustrated in FIG. 6, it includes an interface 601 of the terminal device and a shooting guidance control 602 on the interface. In FIG. 6, the control 602 may be presented in the form of a button plus a time axis, the button is located in the middle of the control and the time axis is embodied on the periphery of the button. If the clip duration of each clip is 8 seconds and the number of clips is 8, 8 time sub-intervals in FIG. 6 may appear on the button. In this way, through the presentation of the detailed guidance guide control, the user may clearly follow the shooting guidance information to shoot or upload the video.

In some embodiments, when detecting that the user touches the control, the terminal device, in response to a confirmation operation on the shooting guidance information, obtains target video clips corresponding to the video guidance information and generates a target video based on the target video clips and the target music file.

In some embodiments, each time the user presses the button, a video clip may be shot or uploaded. In some embodiments, after each video clip is shot, the video clip may be previewed, or at least one target video clip or the target video may be deleted in response to a deletion operation.

In this way, the user may freely upload or delete the entire video or several video clips, which improves the convenience of the user and saves the user time to modify the video.

In the related art, the user usually selects the background music in advance and performs video shooting, or adds the background music after shooting the video, thereby obtaining the video with the background music. However, general users may be limited by shooting experience and the video content and background music of videos obtained in this way may have rhythm mismatch. They may use video editing tools after shooting videos to edit the video content to adapt to the music rhythm to wait for videos with the better playing effect, which may have cumbersome operations and lose part of the original video content.

In the disclosure, the shooting guidance information is obtained based on the beat information of the target music file and the preset shooting duration. The shooting guidance information displayed on the interface may guide the user to directly shoot the video that fits beats of the target music, without video clip adaptation after shooting. The loss of original video content caused by video clip adaptation may be avoided and the efficiency of video shooting may be improved.

In addition, in the process of guiding the user to directly shoot the video adapted to the beats of the target music, the disclosure measures the decreasing of the user's shooting complexity and the increasing of the completeness of the expression content and further determines the appropriate shooting guidance information, fully considering the user's shooting experience.

Figure 7:
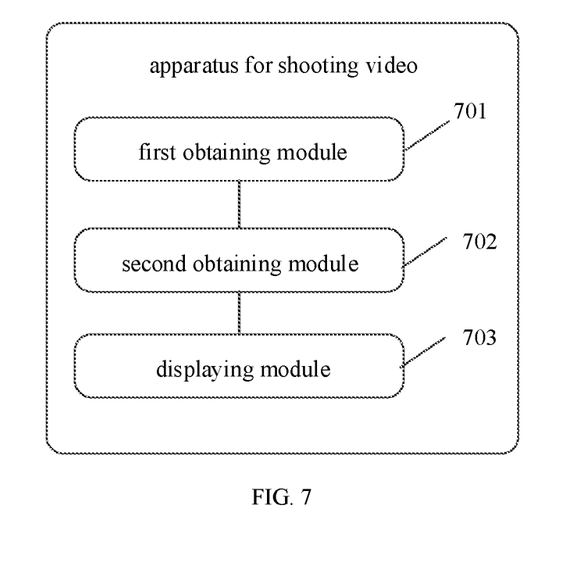
FIG. 7 is a block diagram illustrating an apparatus for shooting a video according to some embodiments of the disclosure.

FIG. 7 is a block diagram illustrating an apparatus for shooting a video according to some embodiments of the disclosure. As illustrated in FIG. 7, the apparatus includes a first obtaining module 701, a second obtaining module 702 and a displaying module 703.

The first obtaining module 701 is configured to obtain a target music file for shooting the video and a preset shooting duration.

The second obtaining module 702 is configured to obtain shooting guidance information based on beat information of the target music file and the preset shooting duration. The shooting guidance information includes a number of clips of the video within the preset shooting duration and a clip duration of each of the clips.

The displaying module 703 is configured to display the shooting guidance information in a shooting interface.

In some embodiments, the second obtaining module is configured to: determine the number of clips of the video and the clip duration of each of the clips based on a plurality of beat durations, the preset shooting duration, a preset clip duration and a preset number of clips, in response to the beat information including the plurality of beat durations; and determine the shooting guidance information based on the number of clips of the video and the clip duration of each of the clips.

In some embodiments, the second obtaining module is configured to: determine an initial clip duration based on a beat duration in response to the beat information including the beat duration and the beat duration satisfying a preset clip duration; determine an initial number of clips based on the preset shooting duration and the initial clip duration; determine the number of clips of the video based on the initial number of clips in response to the initial number of clips satisfying a preset number of clips; determine the clip duration of each of the clips based on the initial clip duration; and determine the shooting guidance information based on the number of clips of the video and the clip duration of each of the clips.

In some embodiments, the second obtaining module is configured to: obtain the initial clip duration by multiplying the beat duration by a first preset multiple in response to the beat duration not satisfying the preset clip duration; the initial clip duration satisfying the preset clip duration; determine the initial number of clips based on the preset shooting duration and the initial clip duration; determine the number of clips of the video based on the initial number of clips in response to the initial number of clips satisfying the preset number of clips; determine the clip duration of each of the clips based on the initial clip duration; and determine the shooting guidance information based on the number of clips of the video and the clip duration of each of the clips.

In some embodiments, the second obtaining module is configured to: obtain an adjusted clip duration by multiplying the beat duration by a second preset multiple in response to the initial number of clips not satisfying the preset number of clips; the adjusted clip duration satisfying the preset clip duration; determine an adjusted number of clips based on the preset shooting duration and the adjusted clip duration; determine the number of clips of the video based on the adjusted number of clips in response to the adjusted number of clips satisfying the preset number of clips; determine the clip duration of each of the clips based on the adjusted clip duration; and determine the shooting guidance information based on the number of clips of the video and the clip duration of each of the clips.

In some embodiments, the apparatus further includes: a third obtaining module configured to obtain a set of historical videos; a target video determining module configured to determine a target historical video that satisfies requirements from the set of historical videos based on video attribute information, the video attribute information including at least one of: a number of forwards, a number of views, a number of likes, a number of rewards, a number of fans and a number of comments; and an analyzing module configured to obtain the preset clip duration and the preset number of clips by analyzing the target historical video.

In some embodiments, the displaying module is configured to: display a shooting guidance control in the shooting interface; a number of time clips included in the shooting guidance control is corresponding to the number of clips of the video and durations of the time clips included in the shooting guidance control are corresponding to durations of the clips one by one.

In some embodiments, the apparatus further includes: a video generating and displaying module configured to obtain target video clips corresponding to the video guidance information in response to a confirmation operation on the video guidance information and generate a target video based on the target video clips and the target music file.

In some embodiments, the apparatus further includes: a deleting and displaying module configured to delete at least one target video clip or the target video in response to a deletion operation.

In some embodiments, the apparatus further includes: a beat information obtaining and displaying module configured to: obtain first data by sampling and quantizing the target music file; obtain first difference data by difference processing on the first data; obtain second data by time-frequency conversion on the first difference data; obtain second difference data by difference processing on the second data; obtain data in a preset number of windows by quantizing the second difference data; and determine the beat information of the target music file based on the data in the preset number of windows.

In some embodiments, the beat information obtaining and displaying module is configured to: determine at least one beat duration in the target music file based on the data in the preset number of windows.

With respect to the apparatuses in the above embodiments, the specific manners for performing operations for individual modules therein have been described in detail in the embodiments regarding the methods, which will not be elaborated herein.

Figure 8:
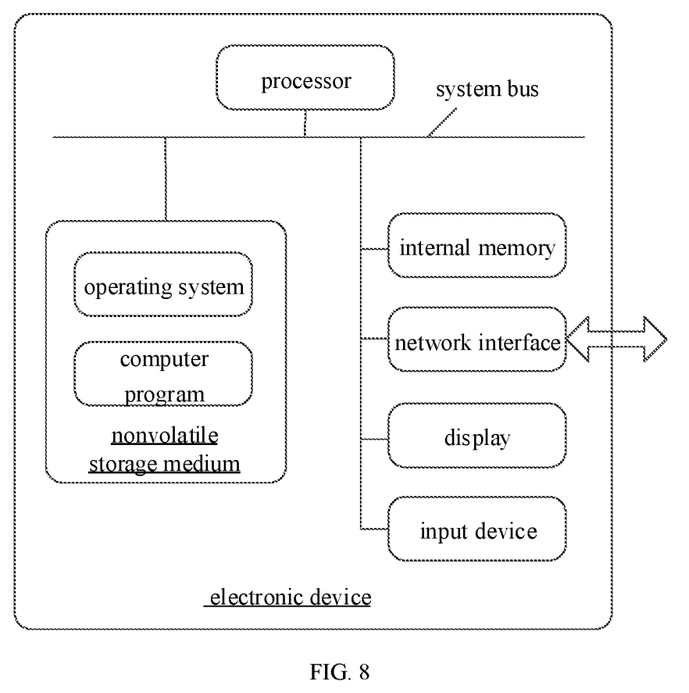
FIG. 8 is a schematic diagram illustrating an electronic device for shooting a video according to some embodiments of the disclosure.

FIG. 8 is a schematic diagram illustrating an electronic device 800 for shooting a video according to some embodiments of the disclosure.

The electronic device may be a server or other devices with the same function as a server. The internal structure diagram may be as illustrated in FIG. 8. The electronic device includes a processor, a memory and a network interface connected through a system bus. The processor of the electronic device is configured to provide calculation and control capabilities. The memory of the electronic device includes a nonvolatile storage medium and an internal memory. The nonvolatile storage medium stores an operating system and a computer program. The internal memory provides an environment for operations of the operating system and computer program in the nonvolatile storage medium. The network interface of the electronic device is configured to communicate with an external terminal through a network connection. The computer program is executed by the processor to realize the method for shooting the video.

Those skilled in the art may understand that the structure in FIG. 8 is only a block diagram of a part of the structure related to the solutions of the disclosure and may not constitute a limitation on the electronic device to which the solutions of the disclosure is applied. The specific electronic device may include more or less parts than shown in the figure or combine some parts or has a different arrangement of parts.

In some embodiments, a server is also provided, including: a processor; and a memory for storing instructions executable by the processor. The processor is configured to execute the instructions to perform the method for shooting the video in the embodiments of the disclosure.

In some embodiments, a storage medium is also provided. When instructions in the storage medium are executed by the processor of the electronic device, the electronic device may be caused to perform the method for shooting the video in the embodiments of the disclosure.

In some embodiments, a computer program product containing instructions is also provided. When the computer program product runs on a computer, the computer may be caused to perform the method for shooting the video in the embodiments of the disclosure.

Those skilled in the art may understand that all or part of processes in the above-mentioned embodiment methods may be implemented by instructing relevant hardware through a computer program. The computer program may be stored in a nonvolatile computer-readable storage medium. When the computer program is executed, it may include procedures of the above-mentioned method embodiments. Any reference to the memory, storage, database or other media used in the embodiments provided in the disclosure may include a nonvolatile and/or volatile memory. The nonvolatile memory may include a read only memory (ROM), a programmable ROM (PROM), an electrically programmable ROM (EPROM), an electrically erasable programmable ROM (EEPROM) or a flash memory. The volatile memory may include a random access memory (RAM) or an external cache memory. As an illustration and not a limitation, RAM is available in many forms, such as static RAM (SRAM), dynamic RAM (DRAM), synchronous DRAM (SDRAM), double data rate SDRAM (DDRSDRAM), enhanced SDRAM (ESDRAM), synchlink DRAM (SLDRAM), memory bus (Rambus) direct RAM (RDRAM), direct memory bus dynamic RAM (DRDRAM), memory bus dynamic RAM (RDRAM), etc.

Those skilled in the art will easily think of other embodiments of the disclosure after considering the specification and practicing the disclosure disclosed herein. The disclosure is intended to cover any variations, uses or adaptive changes of the disclosure. These variations, uses or adaptive changes follow the general principles of the disclosure and include common knowledge or conventional technical means in the technical field that are not disclosed in the disclosure. The description and the embodiments are to be regarded as exemplary only and the true scope and spirit of the disclosure are pointed out by the following claims.

It will be appreciated that the disclosure is not limited to the exact construction that has been described above and illustrated in the accompanying drawings, and that various modifications and changes may be made without departing from the scope thereof. It is intended that the scope of the disclosure only be limited by the appended claims.

What is claimed is:

1. A method for shooting a video, comprising:
   obtaining a target music file for shooting the video and a preset shooting duration;
   obtaining shooting guidance information based on beat information of the target music file and the preset shooting duration; the shooting guidance information comprising a number of clips of the video within the preset shooting duration and a clip duration of each of the clips;
   wherein the number is greater than 1 and the clip duration of each of the clips is determined based on the beat information; and
   displaying the shooting guidance information in a shooting interface,
   wherein said obtaining the shooting guidance information based on the beat information of the target music file and the preset shooting duration comprises:
   determining an initial clip duration based on a beat duration in response to the beat information comprising the beat duration and the beat duration satisfying a preset clip duration;
   determining an initial number of clips based on the preset shooting duration and the initial clip duration;
   determining the number of clips of the video based on the initial number of clips in response to the initial number of clips satisfying a preset number of clips;
   determining the clip duration of each of the clips based on the initial clip duration; and
   determining the shooting guidance information based on the number of clips of the video and the clip duration of each of the clips,
   wherein the method further comprises:
   obtaining the initial clip duration by multiplying the beat duration by a first preset multiple in response to the beat duration not satisfying the preset clip duration; the initial clip duration satisfying the preset clip duration;
   determining the initial number of clips based on the preset shooting duration and the initial clip duration;
   determining the number of clips of the video based on the initial number of clips in response to the initial number of clips satisfying the preset number of clips;
   determining the clip duration of each of the clips based on the initial clip duration; and
   determining the shooting guidance information based on the number of clips of the video and the clip duration of each of the clips.

2. The method as claimed in claim 1, wherein said obtaining the shooting guidance information based on the beat information of the target music file and the preset shooting duration comprises:
   determining the number of clips of the video and the clip duration of each of the clips based on a plurality of beat durations, the preset shooting duration, a preset clip duration and a preset number of clips, in response to the beat information comprising the plurality of beat durations; and
   determining the shooting guidance information based on the number of clips of the video and the clip duration of each of the clips.

3. The method as claimed in claim 1, further comprising:
   obtaining an adjusted clip duration by multiplying the beat duration by a second preset multiple in response to the initial number of clips not satisfying the preset number of clips; the adjusted clip duration satisfying the preset clip duration;
   determining an adjusted number of clips based on the preset shooting duration and the adjusted clip duration;
   determining the number of clips of the video based on the adjusted number of clips in response to the adjusted number of clips satisfying the preset number of clips;

determining the clip duration of each of the clips based on the adjusted clip duration; and
determining the shooting guidance information based on the number of clips of the video and the clip duration of each of the clips.

4. The method as claimed in claim 3, further comprising:
obtaining a set of historical videos;
determining a target historical video that satisfies requirements from the set of historical videos based on video attribute information, the video attribute information comprising at least one of: a number of forwards, a number of views, a number of likes, a number of rewards, a number of fans and a number of comments; and
obtaining the preset clip duration and the preset number of clips by analyzing the target historical video.

5. The method as claimed in claim 1, wherein said displaying the shooting guidance information in the shooting interface comprises:
displaying a shooting guidance control in the shooting interface; a number of time clips included in the shooting guidance control is corresponding to the number of clips of the video and durations of the time clips included in the shooting guidance control are corresponding to durations of the clips one by one.

6. The method as claimed in claim 1, further comprising:
obtaining target video clips corresponding to the video guidance information in response to a confirmation operation on the video guidance information and generating a target video based on the target video clips and the target music file.

7. The method as claimed in claim 6, further comprising:
deleting at least one target video clip or the target video in response to a deletion operation.

8. The method as claimed in claim 1, further comprising:
obtaining first data by sampling and quantizing the target music file;
obtaining first difference data by performing difference processing on the first data;
obtaining second data by performing time-frequency conversion on the first difference data;
obtaining second difference data by performing difference processing on the second data;
obtaining data in a preset number of windows by quantizing the second difference data; and
determining the beat information of the target music file based on the data in the preset number of windows.

9. The method as claimed in claim 8, wherein said determining the beat information of the target music file based on the data in the preset number of windows comprises:
determining at least one beat duration in the target music file based on the data in the preset number of windows.

10. An electronic device, comprising:
a processor; and
a memory for storing instructions executable by the processor;
wherein the processor is configured to execute the instructions to:
obtain a target music file for shooting a video and a preset shooting duration;
obtain shooting guidance information based on beat information of the target music file and the preset shooting duration; the shooting guidance information comprising a number of clips of the video within the preset shooting duration and a clip duration of each of the clips; wherein the number is greater than 1 and the clip duration of each of the clips is determined based on the beat information; and
display the shooting guidance information in a shooting interface,
wherein the processor is further configured to execute the instructions to:
determine an initial clip duration based on a beat duration in response to the beat information comprising the beat duration and the beat duration satisfying a preset clip duration;
determine an initial number of clips based on the preset shooting duration and the initial clip duration;
determine the number of clips of the video based on the initial number of clips in response to the initial number of clips satisfying a preset number of clips;
determine the clip duration of each of the clips based on the initial clip duration; and
determine the shooting guidance information based on the number of clips of the video and the clip duration of each of the clips;
wherein the processor is configured to execute the instructions to:
obtain the initial clip duration by multiplying the beat duration by a first preset multiple in response to the beat duration not satisfying the preset clip duration; the initial clip duration satisfying the preset clip duration;
determine the initial number of clips based on the preset shooting duration and the initial clip duration;
determine the number of clips of the video based on the initial number of clips in response to the initial number of clips satisfying the preset number of clips;
determine the clip duration of each of the clips based on the initial clip duration; and
determine the shooting guidance information based on the number of clips of the video and the clip duration of each of the clips.

11. The device as claimed in claim 10, wherein the processor is configured to execute the instructions to:
determine the number of clips of the video and the clip duration of each of the clips based on a plurality of beat durations, the preset shooting duration, a preset clip duration and a preset number of clips, in response to the beat information comprising the plurality of beat durations; and
determine the shooting guidance information based on the number of clips of the video and the clip duration of each of the clips.

12. The device as claimed in claim 10, wherein the processor is configured to execute the instructions to:
obtain an adjusted clip duration by multiplying the beat duration by a second preset multiple in response to the initial number of clips not satisfying the preset number of clips; the adjusted clip duration satisfying the preset clip duration;
determine an adjusted number of clips based on the preset shooting duration and the adjusted clip duration;
determine the number of clips of the video based on the adjusted number of clips in response to the adjusted number of clips satisfying the preset number of clips;
determine the clip duration of each of the clips based on the adjusted clip duration; and
determine the shooting guidance information based on the number of clips of the video and the clip duration of each of the clips.

13. The device as claimed in claim 12, wherein the processor is configured to execute the instructions to:

obtain a set of historical videos;

determine a target historical video that satisfies requirements from the set of historical videos based on video attribute information, the video attribute information comprising at least one of: a number of forwards, a number of views, a number of likes, a number of rewards, a number of fans and a number of comments; and obtain the preset clip duration and the preset number of clips by analyzing the target historical video.

14. The device as claimed in claim 10, wherein the processor is configured to execute the instructions to:

display a shooting guidance control in the shooting interface; a number of time clips included in the shooting guidance control is corresponding to the number of clips of the video and durations of the time clips included in the shooting guidance control are corresponding to durations of the clips one by one.

15. The device as claimed in claim 10, wherein the processor is configured to execute the instructions to:

obtain target video clips corresponding to the video guidance information in response to a confirmation operation on the video guidance information and generate a target video based on the target video clips and the target music file.

16. A non-transitory computer-readable storage medium having stored therein instructions that, when executed by a processor of an electronic device, causes the electronic device to:

obtain a target music file for shooting a video and a preset shooting duration;

obtain shooting guidance information based on beat information of the target music file and the preset shooting duration; the shooting guidance information comprising a number of clips of the video within the preset shooting duration and a clip duration of each of the clips; wherein the number is greater than 1 and the clip duration of each of the clips is determined based on the beat information; and display the shooting guidance information in a shooting interface, wherein when the instructions are executed by a processor of an electronic device, causes the electronic device to:

determine an initial clip duration based on a beat duration in response to the beat information comprising the beat duration and the beat duration satisfying a preset clip duration;

determine an initial number of clips based on the preset shooting duration and the initial clip duration;

determine the number of clips of the video based on the initial number of clips in response to the initial number of clips satisfying a preset number of clips;

determine the clip duration of each of the clips based on the initial clip duration; and determine the shooting guidance information based on the number of clips of the video and the clip duration of each of the clips;

wherein when the instructions are executed by a processor of an electronic device, causes the electronic device to:

obtain the initial clip duration by multiplying the beat duration by a first preset multiple in response to the beat duration not satisfying the preset clip duration; the initial clip duration satisfying the preset clip duration;

determine the initial number of clips based on the preset shooting duration and the initial clip duration;

determine the number of clips of the video based on the initial number of clips in response to the initial number of clips satisfying the preset number of clips;

determine the clip duration of each of the clips based on the initial clip duration; and determine the shooting guidance information based on the number of clips of the video and the clip duration of each of the clips.

* * * * *